March 17, 1942.   H. KREISINGER   2,276,659
WET REFUSE FURNACE AND SYSTEM
Filed Feb. 13, 1939   3 Sheets-Sheet 1

INVENTOR
Henry Kreisinger
BY
James J. Whalen
ATTORNEY

March 17, 1942. H. KREISINGER 2,276,659
WET REFUSE FURNACE AND SYSTEM
Filed Feb. 13, 1939 3 Sheets-Sheet 2

INVENTOR
Henry Kreisinger
BY
ATTORNEY

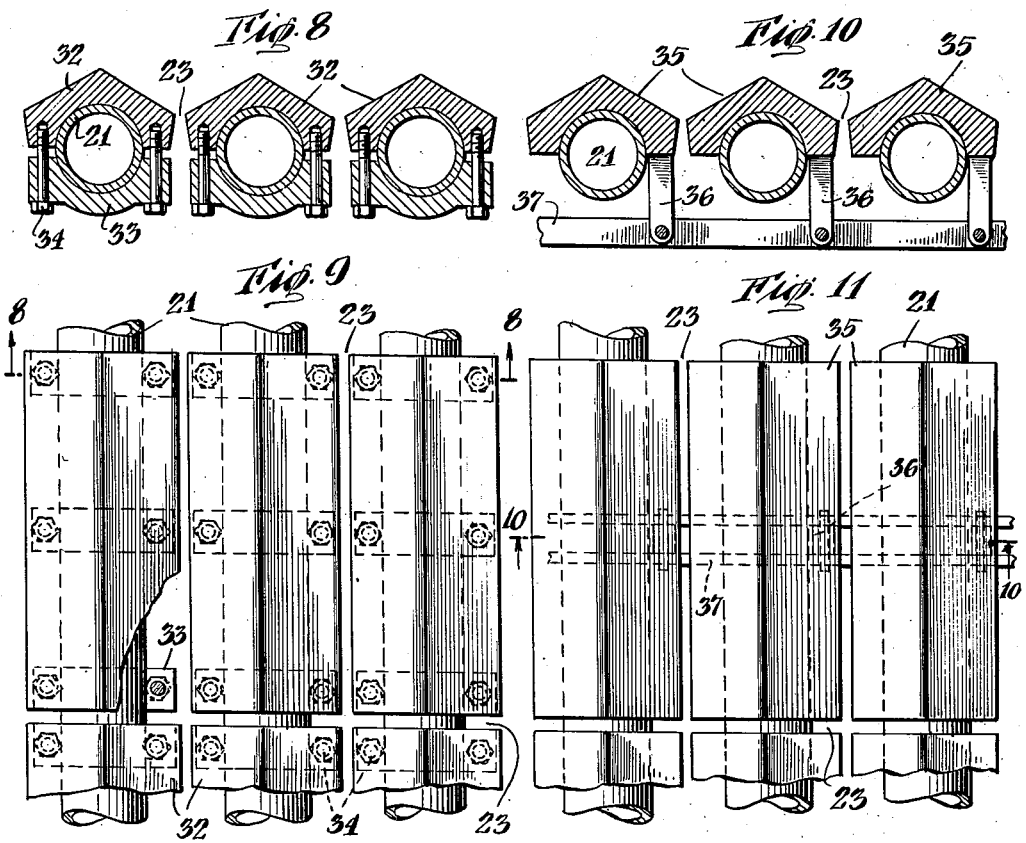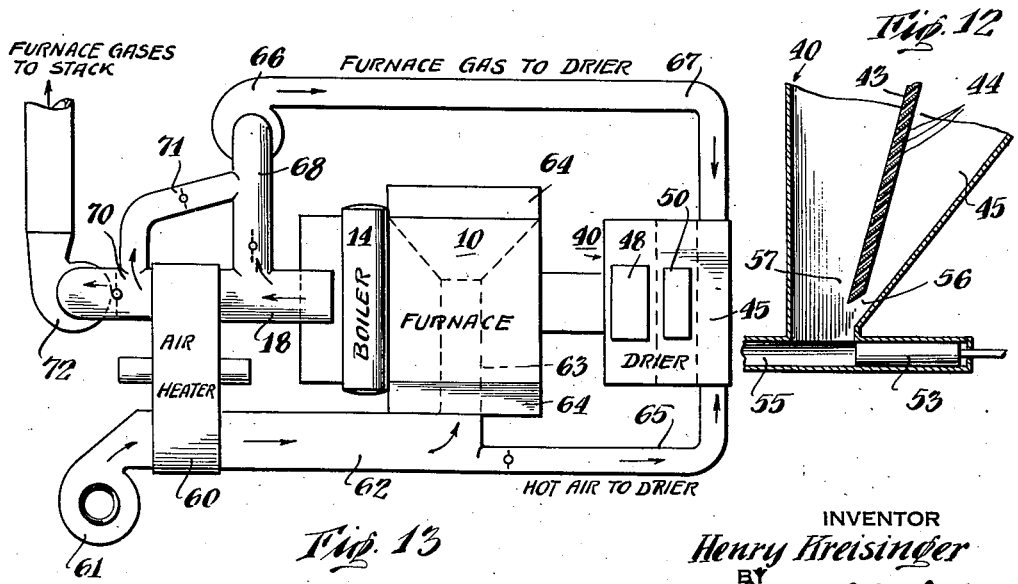

Patented Mar. 17, 1942

2,276,659

UNITED STATES PATENT OFFICE 2,276,659

WET REFUSE FURNACE AND SYSTEM

Henry Kreisinger, Piermont, N. Y., assignor to Combustion Engineering Company, Inc., New York, N. Y.

Application February 13, 1939, Serial No. 256,150

2 Claims. (Cl. 122—371)

This invention relates to burning wet refuse fuel and particularly in a water-cooled furnace.

Heretofore the burning of wet refuse, such as wood refuse fuel in lumber camps, from sawmills or the like, was done in a furnace, usually of the Dutch oven type whose walls were faced with a refractory material which would become heated and thereby aid in maintaining the temperatures within the furnace that are necessary for burning such fuels. Commonly the furnace has been equipped with a plain grate, either in horizontal or sloping position, on to which the fuel was dropped through chutes more or less intermittently and on which it burned in a pile. Air for combustion was drawn in by the furnace draft, some coming in with the fuel through the chutes, some through the furnace doors, some through special openings in the walls provided therefor and some through the grate. Neither fuel nor air supply was closely controlled and, as a result, excess air and smoky chimneys were common. A considerable portion of the finer fuel was picked up by the ascending gases as the fuel dropped into the furnace and was carried away therewith out through the offtake of the furnace. When the moisture of the fuel was relatively high, the furnace temperature was low, interfering not only with proper combustion but also reducing the amount of steam that could be generated from the gases when so used. The maintenance of the refractory walls of these furnaces was also high and responsible for unnecessary shutdowns.

According to this invention, wet refuse fuel such as wood refuse may be burned without impairing its efficient combustion within a furnace independent of hot refractories which furnace has its walls completely faced with water-cooled surface. The introduction of the refuse fuel into the furnace is continuous without any portion being carried away through the offtake. Its moisture content is reduced before entering the furnace by means of the heat from the flue gases and combustion is controllable over a wide range of moisture content for the fuel. The air for combustion is also controlled and so introduced to the burning refuse that an efficient combustion results with relatively low excess air.

How the foregoing, together with other objects and advantages as may hereinafter appear or are incident to my invention are realized, is illustrated in preferred form in the accompanying drawings, wherein:

Figs. 4, 6, 8 and 10 are partial sectional views through the grate as viewed in the line X—X in Fig. 2 each illustrating a different form of the furnace grate structure.

Figs. 5, 7, 9 and 11 are partial plan views of the grate structures illustrated in Figs. 4, 6, 8 and 10 respectively.

Fig. 12 is a fragmentary section through the drier showing a sifting removal means;

Fig. 13 is a diagrammatic plan view of the drier, furnace, air heater, fans and the interconnecting ducts.

Figure 1:
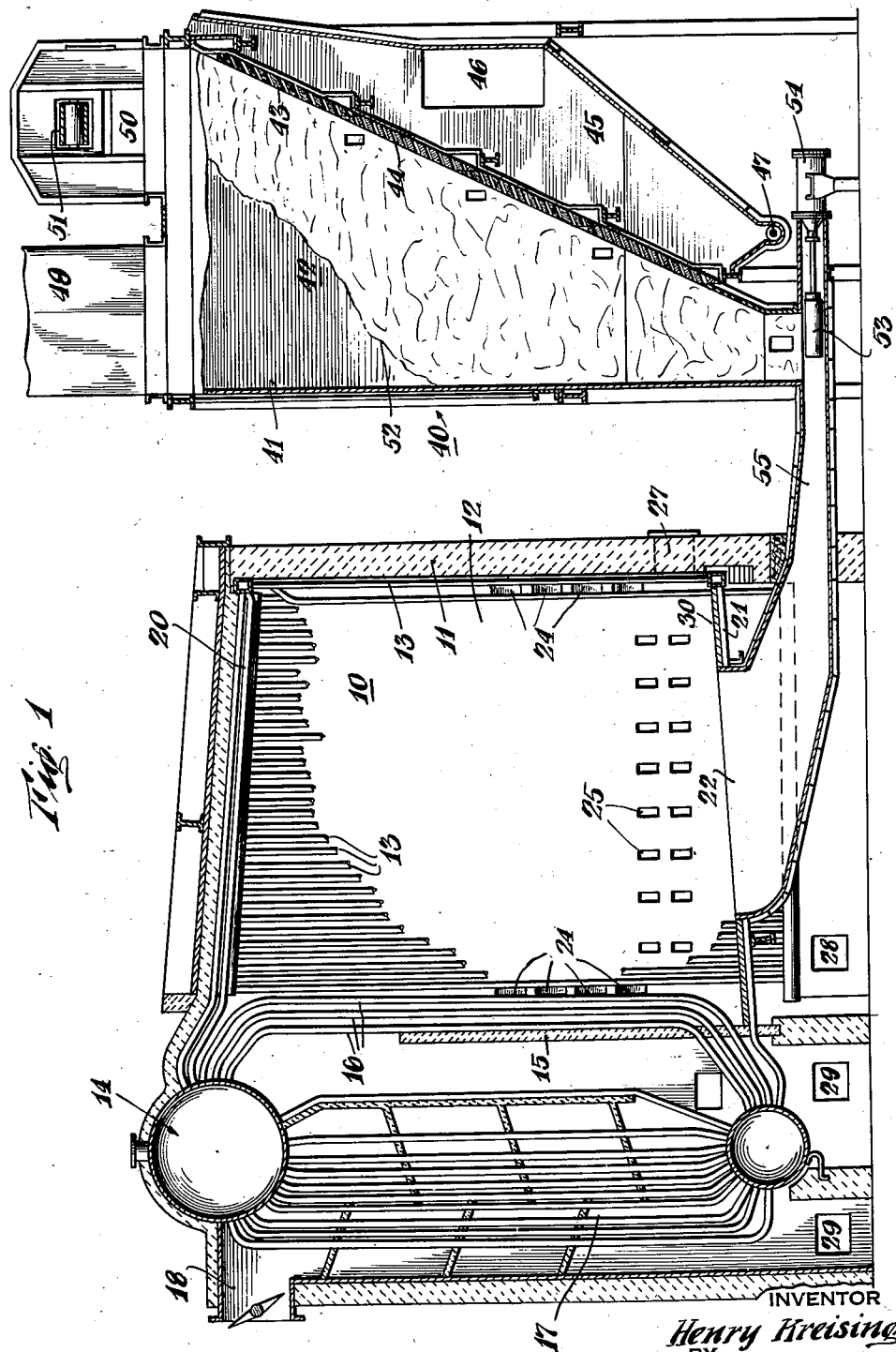
Fig. 1 is a longitudinal section through a wood refuse drying, feeding and burning apparatus.

Referring first to Fig. 1, 10 is the furnace having the front wall 11 and side walls 12 faced with boiler tubes 13 that are connected into the circulation of the boiler designated generally by the numeral 14. The rear wall of the furnace is formed by a baffle 15 which is protected from the heat of the furnace by boiler tubes 16 which in this instance are arranged in three rows and form a cooling screen across which the gases pass on their way to the main generating bank 17 of the boiler over the top of baffle 15. Boiler 14 has upper and lower drums connected by a single bank of tubes 17 which are baffled for a single upward pass to an outlet 18.

Figure 2:
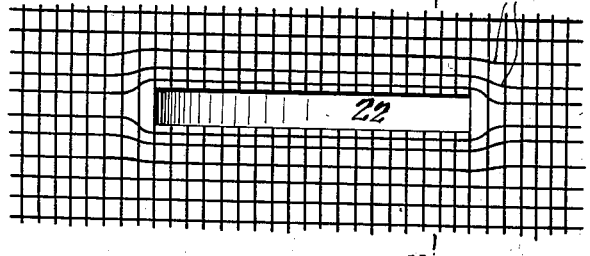
Fig. 2 is a partial plan view of the grate showing a fuel feed opening into the furnace.
Figure 3:
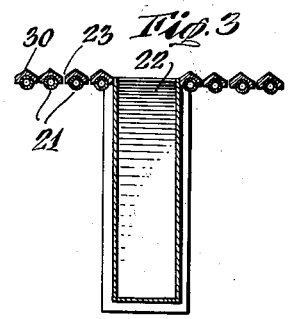
Fig. 3 is a transverse section, 3—3 on Fig. 1, through the fuel feed duct to the furnace.

The roof of the furnace is faced with boiler tubes 20 and its floor is made up of rows of boiler tubes 21, both sets of tubes being connected into the circulation of the boiler, as by means of the front wall tubes 13. In the floor there are provided one or more openings 22 for the admission of the refuse fuel into the furnace as shown in Figs. 2 and 3. The floor forms a water-cooled grate and is provided with narrow apertures 23 through which air may enter and through which the ashes from the fuel may fall into an ash pit below. The manner in which the apertures 23 are formed will become apparent upon consideration of the detailed description of the floor construction as set forth hereinafter.

In the vertical walls of the furnace, at near the four vertical corners, there are provided air ports 24 which inject air for combustion into the furnace in a direction so as to impart a vortical motion to the mixture of air and gases from the fuel. Additional air ports 25 are provided in the side walls at a lower level than the ports 24 and so located as to inject air against the sides of the fuel bed. Suitable cleanout doors are provided for access to the fuel bed, ash pit and gas dust siftings pit as at 27, 28 and 29, respectively.

Figure 4:
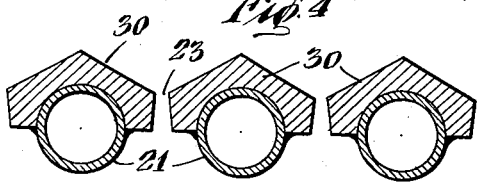
Figure 6:
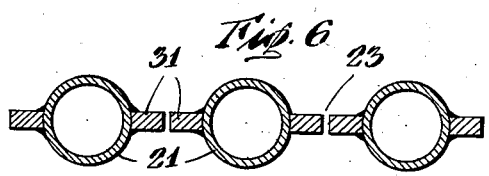
Figure 5:
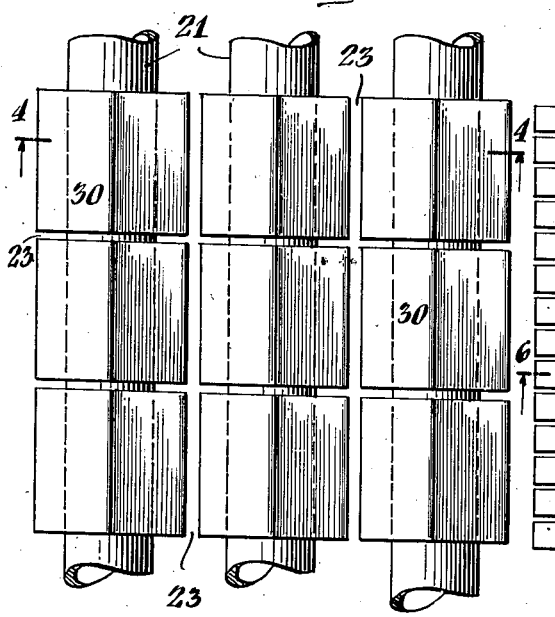
Figure 7:
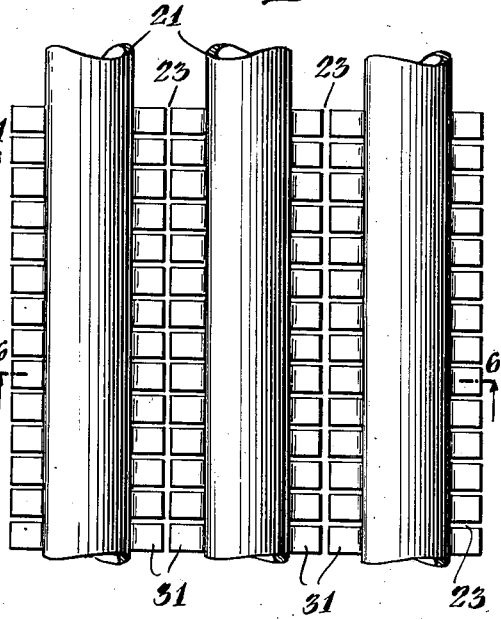

In the form illustrated in Fig. 4 and Fig. 5 the floor tubes 21 are covered by metallic blocks 30 welded thereto, the longitudinal and end edges of the blocks being spaced apart so as to form the previously mentioned air ports therebetween. The tops of the blocks are sloped toward these ports so that ash may slide down the inclines and through the ports into the ash pit below. The said inclines also serve to more uniformly distribute the air passing up through the fuel bed. In Fig. 6 and Fig. 7 is shown another form of floor construction. Here the floor tubes 23 have finned extensions 31 welded thereon and spaced apart so as to form the air ports 23 therebetween. In Fig. 8 and Fig. 9 the floor tubes 21 are provided with metallic blocks 32 similar to those in Figs. 4 and 5 excepting that they are bolted on by means of yokes 33 and bolts 34. The air ports are provided as before. In Fig. 10 and Fig. 11 the boiler tubes 21 are provided with metalic blocks 35 similar to those in Figs. 4 and 5 excepting that these blocks are loosely placed on the tubes and are provided with levers 36 which in turn are connected with a rocking bar 37 for the purpose of rocking the blocks in order to shake down the ashes.

Closely adjacent the front of furnace 10 there is arranged a drier 40 consisting of a front wall 41, side walls 42 and a rear wall formed of plates 43 inclined downwardly and inwardly from the top toward the bottom of the drier. The plates 43 have gas ports 44 therein which are directed downwardly toward the interior of the drier. Beneath and outwardly of the plates 43 there is provided a gas chamber 45 which receives hot gas or heated air from the boiler through gas inlet 46. The ports 44 are preferably narrow and may be in the form of narrow slots extending partially or completely across the greater part of the width of the plates 43, or, alternatively, the ports may be in the form of many small apertures formed in the plates. Thus, in addition to preventing the particles of wet fuel from falling into gas chamber the construction of the ports so affects the velocity of the drying gases as to produce relatively high velocity gas jets into the bed of fuel on the plates 43.

For the removal of any flue dust or cinders when flue gases are used for drying or siftings which may fall into the gas chamber 45, there is provided a siftings removal means 47 such as a screw conveyor. A gas outlet 48 is provided at the top of the drier. A refuse fuel inlet 50 is provided at the top of the drier including a fuel delivery means such as a conveyor 51 which delivers the refuse fuel to the top of the drier plates 43. The refuse fuel forms a bed on the plates of a thickness somewhat as shown by line 52 which represents the top surface thereof. The refuse fuel is withdrawn from the drier at the bottom by means which delivers it to the furnace 10, such as a pusher or pushers 53 actuated, for example, by a fluid driven piston within a cylinder 54. The pusher or ram 53 on its forward stroke drives the refuse fuel through the conduit 55 into the furnace 10. The conduit 55 has an expanding cross-section in the direction of the advance of the refuse fuel to the furnace. The refuse fuel is driven upwardly into the furnace through the opening or openings 22 in the floor thereof.

Fig. 12 is a fragmentary section through the bottom of the drier 40 showing another arrangement for removing the siftings from the gas chamber 45. The bottom ends of plates 43 terminate short of the bottom of the drier thereby forming an opening 56 which may extend for the entire width of the drier through which the siftings collecting at the bottom of chamber 45 are drawn down and out of the chamber by the downward movement of the refuse fuel through the throat 57 and the movement of the pusher or pushers 53 and thence delivered into conduit 55.

Fig. 13 is a diagrammatic plan view of the assembly including drier 40, furnace 10, boiler 14, an air heater 60 and the interconnecting ducts. A fan 61 delivers air through air heater 60 and duct 62 to furnace 10. Duct 63, which is here shown below the furnace, conveys the air to the opposite furnace side and to the ash pit and grate ports 23 through a dampered connection (not shown). Ducts 64 at the furnace sides are connected to ducts 62, 63 through dampered connections (not shown) and supply air to the corner and mid-wall air ports 24 and 25. A duct 65 conveys hot air to the drier chamber 45 when air is used for drying. A fan 66 takes flue gases either directly from boiler outlet 18 through duct 68 or from the gas outlet 70 of the air heater 60 through duct 71 and delivers them through duct 67 to chamber 45 of drier 40 when gases are used for drying. A fan 72 removes flue gases from the air heater and delivers them to the chimney stack. The ducts are appropriately dampered so that either furnace gases or air preheated thereby or both may be directed as a drying medium to chamber 45. As shown, the dampers are set so that the gases leaving the boiler offtake 18 are used in drier 40.

The operation of my improved refuse fuel burning apparatus is as follows: The wet refuse fuel is delivered to the drier 40 by the conveyor 51 and slides down the inclined surface of the plates 43 over the gas ports 44 to the bottom, part of the weight of the refuse fuel being carried by the inclined plates which relieves the tendency of the fuels to pack at the bottom of the drier. Hot gases are forced from the gas chamber 45 through gas ports 44 and through the body of refuse fuel, absorbing moisture therefrom, and through the interstices between the fuel particles. Thence the gases pass out through the offtake 48 of the drier, carrying the moisture along with them. Since the gases leave the refuse fuel over a large surface, but little dust is entrained by them. The downwardly inclined jets of gas through the gas ports of the inclined plates also aid in moving the refuse downwardly. From the bottom of the drier the refuse fuel is delivered by the pusher or pushers 53 through the conduit or conduits 55 which are of expanding cross section in direction of the refuse movement, into the bottom of the furnace. Within the furnace 10 the refuse fuel by being pushed upwardly through the openings 22 in the grate forms into one or more conical-shaped piles, high in the middle and sloping downwardly towards the walls.

The ram provides agitation of fuel pile. During the forward stroke of the ram fuel is pushed with a quick movement upwardly under the fuel pile. This movement causes the top of the pile to rise and some of the burning fuel to roll down the sloping sides. This method of feeding prevents some of the smaller pieces of fuel to be put in suspension of the gases.

In passing through the drier a sufficient amount of moisture is removed from the refuse fuel (which moisture never enters the furnace) so that the heat remaining available for combustion in the refuse fuel will be sufficient to support combustion within the furnace, even when considering the heat absorption from the burning refuse fuel by the water-cooled walls. The air for combustion is preferably heated by an air heater such as 60 which extracts its heat from the flue gases leaving the boiler offtake 18. This additional heat is further useful in maintaining combustion in the water-cooled furnace. Preferably most of the air to burn the fixed carbon in the refuse fuel pile is supplied in controlled amounts through the interstices 23 of the grate. The ash left after the carbon is consumed is cooled by the water-cooled grate to such an extent that fusion of the ash is prevented. Ash drops into the ash pit through the intertube apertures of the grate. The volatile combustible matter distilled from the refuse fuel pile is burned by air delivered in controlled amounts through the air ports 24, 25 in the furnace walls. The lower rows of ports 25 in the side walls burn the volatile matter coming out of the lower parts of the sloping sides of the refuse fuel pile and also burn a part of the fixed carbon on these sides. The upper rows of air ports 24 at or near the furnace corners deliver air for combustion in controlled amounts in jets directed tangentially to form a vortical column of burning gases rising vertically within the furnace thereby causing rapid mixing and combustion of the volatile matter rising from the refuse fuel pile.

By this method of controlled tangential air injection I concentrate the combustion in a zone closely above the fuel bed causing the heat generated to be directly available for driving the remaining moisture and the volatile matter from the fuel below.

The products of combustion leave the furnace after radiating some of their heat to the wall tubes 11, and roof tubes 20 also, and pass through the boiler convection heating surface 17 where they give up much of their remaining heat. After leaving the boiler the gases are preferably passed through an air heater wherein the air for combustion is heated. As has been described herein, said air heater may also heat additional air for use in removing moisture from the refuse fuel in the drier, either in addition to or as a substitute for furnace gases. If heated air is not used in the drier, a portion of the flue gases may be used in its place, or flue gases may be used after having passed through the air heater.

Due to my novel method of removing a substantial portion of the moisture content of the refuse before entering the furnace, thereby increasing the amount of heat in the fuel available for raising the temperature of combustion and due to my novel means for delivering the fuel and air into the furnace, I am able to burn the refuse in a fully water cooled furnace, able to abstract substantially more of the heat from the refuse than has heretofore been possible and make substantially more steam.

What I claim is:

1. In a furnace for burning wet refuse fuel such as wet wood chips, blocks, shavings and the like; a grate within the furnace for supporting the fuel comprising: spaced fluid circulating tubes, some of said tubes being so formed and arranged as to provide one or more openings in the grate through which the fuel to be burned thereon may be fed from therebeneath so that the fuel deposited on the grate forms one or more generally conically shaped piles; metallic blocks mounted on the upper sides of said tubes to form the fuel supporting surface, said blocks being so spaced and arranged on the tubes as to provide narrow apertures through which air may be forced from below the grate through the latter and the body of fuel thereon; means for feeding the fuel from underneath said grate and through said openings therein to the supporting surfaces of said blocks; means for supplying air under pressure to the under side of said grate to pass through said apertures into the fuel on the grate and into said furnace; air ports so located in the walls of the furnace as to direct jets of air against the sides of the pile of fuel on said grate; other air ports located above said first mentioned ports and so arranged at or near the corners of the furnace to direct air tangentially to an imaginary circle within the furnace for creating a vortical column of burning gases and air; and means to supply air under pressure to said ports.

2. In a furnace for burning wet refuse fuel such as wet wood chips, blocks, shavings and the like; a grate within the furnace for supporting the fuel comprising: spaced fluid circulating tubes, some of said tubes being so formed and arranged as to provide one or more openings in the grate through which the fuel to be burned thereon may be fed from therebeneath so that the fuel deposited on the grate forms one or more generally conically shaped piles; spaced metallic blocks forming a fuel supporting surface and arranged to provide narrow apertures through which air may be forced from below the grate through the latter and the body of fuel thereon, said blocks being loosely mounted on the tubes and having under surfaces conforming substantially to the contour thereof so as to be rockable thereon; means for feeding the fuel underneath said grate and through said openings therein to the supporting surfaces of said blocks; means for supplying air under pressure to the under side of said grate to pass through said apertures into the fuel on the grate and into said furnace; a member depending from each block and into the space beneath the grate; and means interconnecting a plurality of said members and operable to rock the related blocks on the associated tubes for dumping ashes on the block surfaces through said apertures.

HENRY KREISINGER.